US006158617A

United States Patent [19]

Hershey et al.

[11] Patent Number: 6,158,617

[45] **Date of Patent: *Dec. 12, 2000**

[54] CONCENTRATED REDUCED DOSAGE SPRAY PUMP DELIVERY SYSTEM

[75] Inventors: Donald E. Hershey, Cincinnati; Mark T. Lund, West Chester; Marjorie M. Peffly, Cincinnati, all of Ohio

[73] Assignee: The Procter & Gamble Company, Cincinnati, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/741,246

[22] Filed: Oct. 30, 1996

[51] Int. Cl.[7] .................................................... G01F 11/00

[52] U.S. Cl. ......................... 222/1; 222/321.2; 222/321.9

[58] Field of Search ............................. 222/321.2, 321.7, 222/321.9, 385

[56] References Cited

U.S. PATENT DOCUMENTS

| | | | |
|---|---|---|---|
| 1,767,023 | 6/1930 | Thomas et al. . | |
| 3,137,416 | 6/1964 | Shepherd et al. | 222/394 |
| 3,148,127 | 9/1964 | Marsh | 167/87.1 |
| 3,225,969 | 12/1965 | O'Donnell | 222/394 |
| 3,290,883 | 12/1966 | Giles et al. | 60/55 |
| 3,398,094 | 8/1968 | Blatz et al. | 252/8.55 |
| 3,463,093 | 8/1969 | Pfeiffer et al. | 222/321.9 |
| 3,544,258 | 12/1970 | Presant et al. | 222/192 |
| 3,893,597 | 7/1975 | Ewald | 222/402.22 |
| 4,007,005 | 2/1977 | Patel | 8/127.51 |
| 4,019,657 | 4/1977 | Spitzer et al | 222/136 |
| 4,051,983 | 10/1977 | Anderson | 222/321 |
| 4,124,149 | 11/1978 | Spitzer et al. | 222/402.19 |
| 4,141,472 | 2/1979 | Spitzer et al. | 222/189 |
| 4,192,862 | 3/1980 | Pengilly | 424/47 |
| 4,511,069 | 4/1985 | Kalat | 222/263 |
| 4,529,787 | 7/1985 | Schmidt et al. | 526/317 |
| 4,680,173 | 7/1987 | Burger | 424/47 |
| 4,871,529 | 10/1989 | Sramek | 424/47 |
| 4,874,604 | 10/1989 | Sramek | 424/47 |
| 4,935,224 | 6/1990 | Russo et al. | 424/47 |
| 5,068,099 | 11/1991 | Sramek | 424/47 |
| 5,388,766 | 2/1995 | Buisson | 239/333 |
| 5,482,188 | 1/1996 | Lina | 222/321.2 |
| 5,553,757 | 9/1996 | Wang | 222/321.9 |

FOREIGN PATENT DOCUMENTS

| | | | |
|---|---|---|---|
| 0374348 | 6/1990 | European Pat. Off. | 222/321.2 |

OTHER PUBLICATIONS

SAR® Micropompe Nebulizzatrici Quality (Calidad) & Respect (Respeto), "Screw Pumps".

SAR® Micropompe Nebulizzatrici Serie PAV.C,.

*Primary Examiner*—Joseph A. Kaufman

*Attorney, Agent, or Firm*—Jack L. Oney, Jr.; Michael J. D'Amelio; Rodney M. Young

[57] ABSTRACT

A concentrated reduced dosage spray pump delivery system for dispensing fluids containing actives and volatile organic compounds with reduced emissions of the volatile organic compounds is disclosed. The system includes a housing storing a concentrated fluid containing volatile organic compounds and an effective component, wherein the effective component is concentrated within the fluid. The system also includes a spray pump in fluid communication with the concentrated fluid containing the volatile organic compounds such that the spray pump dispenses the concentrated fluid at a reduced dosage per pump stroke. The combination of the concentrated fluid containing volatile organic compounds and the reduced dosage per pump stroke reduces the emission of volatile organic compounds, while the quantity of actives applied per square area of application surface substantially remains the same.

2 Claims, 3 Drawing Sheets

CONCENTRATED REDUCED DOSAGE SPRAY PUMP DELIVERY SYSTEM

BACKGROUND OF THE INVENTION

1. Field of the Invention

The invention relates to a concentrated reduced dosage spray pump delivery system. More particularly, the invention relates to a spray pump delivery system which combines a reduced dosage spray pump with a concentrated hair spray formulation containing volatile organic compounds. In this way, the present system reduces the emission of volatile organic compounds when the spray pump is actuated.

2. Description of the Prior Art

Current spray pumps deliver fluids by creating pressure within the spray pump. The pump pressure created causes fluids contained within the spray pump to exit an outlet of the spray pump. When one desires to dispense an atomized spray of the fluid, the spray pump must create sufficient pressure to atomize the fluid as it exits the outlet of the spray pump.

Unfortunately, many fluids currently dispensed via spray pumps contain volatile organic compounds. When the fluids are atomized as they exit the outlet of the spray pump, very small particles including volatile organic compounds are created. Many of the small particles dispensed by the spray pump never reach the surface at which they are directed. These small particles are lost to the atmosphere, creating a pollution problem. In addition, the droplets which reach the surface to which they are directed ultimately are washed off the surface and into the atmosphere. These droplets also create a pollution problem. Since these small particles have been found to create a pollution problem, a variety of regulations have been established to limit the permissible emission levels of volatile organic compounds.

One of the most common fluids containing volatile organic compounds which is dispensed by a spray pump is hair spray. Hair spray is especially problematic to spray applications, since the manner in which the hair spray is applied is often critical to the product's usefulness. Specifically, small particles within a small range are required if the hair spray is to work as desired. For example, it is desirable to provide particles between 47 and 65 $\mu$m. If the particle size of the hair spray is too large, the hair spray tends to wet the hair and render it sticky. If, however, the particle size of the hair spray is too small, many particles are lost to the atmosphere and the consumer will be forced to use a larger quantity of the hair spray to style his or her hair.

The size of the particles created by the spray pump is a function of the hair spray, or other atomized fluid, and the structure of the spray pump (including the pump pressure of the spray pump). Current spray pumps produce about 90 psig of pressure to atomize the fluids being expelled. With this low pressure level, the range of spray characteristics that may be provided by the spray pump is limited.

With reference to FIG. 1, a conventional spray pump is disclosed. The pump 10 includes an insert 12, an actuator 14, a gasket 16, a stem 18, a turret 20, a closure 22, a piston 24, a body 26, a spring 28, a pre-compression spring 30, and valve ball 32. These elements function by drawing fluid from a container, atomizing the fluid such that it is dispensed as a spray of many small particles with momentum sufficient to propel the spray at a desired object. A dip tube, container and product are not shown.

More specifically, the insert 12 is placed inside actuator 14 to form a swirl chamber 34 enabling the atomization of fluid as it exits the spray pump 10. The actuator 14 rests on top of the stem 18 and is sealed on the stem outer surface 36. The stem 18 includes an interior chamber 38 which is in fluid communication with the actuator chamber 40 of the actuator 14 and the swirl chamber 34. As will be discussed in greater detail below, actuation of the actuator 14 causes fluid to flow through the interior chamber 38, actuator chamber 40 and swirl chamber 34 until it exits the spray pump through the outlet 42.

A gasket 16 provides a seal between the turret 20 and the stem 18. The gasket 16 rides on the upper surface 44 of flange 45 of the stem 18 and contacts a lower surface 46 of the turret 20. The interaction between the gasket 16, turret 20, and stem 18 creates a seal when all three parts are in contact (normally closed position).

The piston 24, pre-compression spring 30 and gasket 16 are secured about the stem 18. Stem 18 rides through turret 20 and inside body cavity 48. The pre-compression spring 30 acts against the underside 50 of flange 45 of the stem 18 and an upper surface 52 of the piston 24 to maintain inner piston seal 54 closed against the lower sealing surface 56 of the stem 18 when the body cavity 48 of the body 26 is not pressurized by actuation of the actuator 14. The assembled stem 18, piston 24, spring 30 and gasket 16 form a stem assembly 58.

As will be discussed in greater detail below, the piston 24 slides around the stem 18 and provides three sealing surfaces. Briefly, the inner piston seal 54 prevents fluid from flowing into stem cavity 38 until a desired pressure has been reached in body cavity 48. The outer piston seal 60 prevents fluid from leaking between the piston 24 and the cavity inner surface 62 of the body 26. The piston inner lip 64 seals against lower surface 66 of the stem 18 to create the final sealing surface.

The turret 20 supports the structure of the pump 10 by supporting the stem assembly 58, the body 26 and the valve ball 32. Specifically, the pump 10 is assembled in the following manner. After the valve ball 32, return spring 28 and stem assembly 58 are placed inside body cavity 48, the turret 20 is attached to the top surface 68 of the body 26. This creates a closed system when the pump 10 is in the normally closed position.

Closure 22 is mounted on the outer wall of the turret 20. The closure 22 includes internal threading 70 which permits attachment to a container (not shown).

As downward force is applied to the actuator 14, product in the body cavity 48 becomes pressurized. As pressure builds, the force acting on the piston 24 increases and eventually overcomes the pre-compression force of the pre-compression spring 30, causing the piston 24 to slide up the stem 18. Movement of the piston 24 up the stem 18 exposes the stem hole 72. When the stem hole 72 is exposed, product flows into stem cavity 38, to the actuator chamber 40, into the swirl chamber 34 and eventually out of the spray pump 10.

At the bottom of the stroke, the outer piston seal 60 contacts cavity lip 74 of the body 26, thus stopping the movement of piston 24 relative to stem 18. When the pump 10 is initially filled with air, this serves as a priming mechanism, such that it opens stem hole 72 to allow compressed air to escape from body cavity 48. The importance of the opened stem hole 72 is especially pronounced when the pressure drop within the stem assembly 58 is low. On the return stroke, the return spring 28 pushes the stem assembly 58 upward until the gasket 16 contacts the turret 20. A vacuum is formed inside the body cavity 48 during this motion, drawing fluid up the dip tube (not shown) and into the pump 10. The valve ball 32 acts as a check valve and seals against the inlet surface 76 to prevent the undesired flow of fluid between the body 26 and the dip tube.

After reviewing the prior spray pump packages for fluids containing volatile organic compounds, it is apparent that a need exists for a spray pump package which reduces the emission of volatile organic compounds. The present invention provides such a spray pump package.

SUMMARY OF THE INVENTION

It is, therefore, an object of the present invention to provide a concentrated reduced dosage spray pump delivery system for dispensing fluids containing volatile organic compounds with reduced emissions of the volatile organic compounds. The system includes a housing storing a concentrated fluid containing volatile organic compounds and an effective component, wherein the effective component is concentrated within the fluid. The system also includes a spray pump in fluid communication with the concentrated fluid containing the volatile organic compounds such that the spray pump dispenses the concentrated fluid at a reduced dosage per pump stroke. The combination of the concentrated fluid containing volatile organic compounds and the reduced dosage per pump stroke reduces the emission of volatile organic compounds, while the quantity of fluid applied per square area of application surface substantially remains the same.

It is also an object of the present invention to provide a spray pump delivery system wherein the dosage per pump stroke is defined by the equation:

$$\text{Dosage } (D)=\text{Area } (A)*\text{Length } (L)$$

where,

D=fluid dispensed with each pump stroke,

A=the piston area of the spray pump, and

L=stroke length of the actuator when pumping the spray pump; and the dosage per pump stroke is between approximately 0.07 grams/pump stroke and 0.09 grams/pump stroke.

It is another object of the present invention to provide a spray pump delivery system wherein the reduced dosage per pump stroke is produced by reducing the piston area of the spray pump and increasing pump pressure of the spray pump. The pump pressure is defined by the equation:

$$\text{Force } (F)=\text{Pressure } (P)*\text{Area } (A)$$

where,

F=the force necessary to actuate the spray pump,

P=pump pressure created to atomize and dispense fluid from within the spray pump, and A=the piston area of the spray pump; and the spray pump has a pump pressure above approximately 90 psig which atomizes and dispenses the concentrated fluid from within the housing when the spray pump is actuated.

It is a further object of the present invention to provide a spray pump delivery system wherein the fluid is a hair spray.

It is also an object of the present invention to provide a spray pump delivery system wherein the effective component of the hair spray is a polymer and the polymer level is between approximately 4% and 7% per weight of the hair spray.

It is another object of the present invention to provide a spray pump delivery system wherein the resin flux of the fluid remains substantially constant despite the reduced dosage per pump stroke. The resin flux is defined by the following equation:

$$\Phi=(D*r)/((\pi/4)*d^2)$$

where,

Φ=resin flux,

D=dosage per pump stroke and is between approximately 0.07 grams/pump stroke and 0.09 grams/pump stroke, r=percentage effective component content in the fluid and is between approximately 4% and 7% by weight of the fluid, and d=spray pattern diameter and is between approximately 2.9 inches and 3.5 inches.

It is a further object of the present invention to provide a method for reducing the emission of volatile organic compounds when a fluid containing the volatile organic compounds is dispensed by a spray pump. The method is accomplished by concentrating an effective component of the fluid (while maintaining the percentage of volatile organic compounds within the fluid), reducing the dosage of fluid dispensed with each pump stroke of the spray pump, and applying the fluid to a surface.

It is also an object of the present invention to provide a reduced dosage spray pump delivery system for dispensing fluids containing volatile organic compounds with reduced emissions of the volatile organic compounds, wherein a conventional spray pump delivery system includes a quantity x of fluid containing a quantity y of volatile organic compounds and a quantity z of an effective component, and the conventional spray pump delivery system is dispensed at a dosage of w grains/pump stroke of the spray pump with a resin flux of v. The reduced dosage spray pump delivery system includes a housing storing a fluid containing volatile organic compounds and an effective component, wherein, when compared to a conventional spray pump delivery system, the ratio of fluid to volatile organic compounds is approximately x to y and the ratio of fluid to the effective component is at most approximately x to z. The system also includes a spray pump in fluid communication with the fluid such that the spray pump atomizes and dispenses the fluid at a dosage less than w grams/pump stroke of the spray pump with a resin flux of approximately v, when compared to a conventional spray pump delivery system. The combination of providing the effective component in the fluid, maintaining the ratio of the fluid to the volatile organic compounds approximately constant, reducing the dosage per pump stroke of the spray pump, and maintaining the resin flux approximately constant, reduces the emission of volatile organic compounds.

It is another object of the present invention to provide a reduced dosage spray pump delivery system wherein, when compared to a conventional spray pump delivery system, the ratio of the fluid to the effective component is less than x to z.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
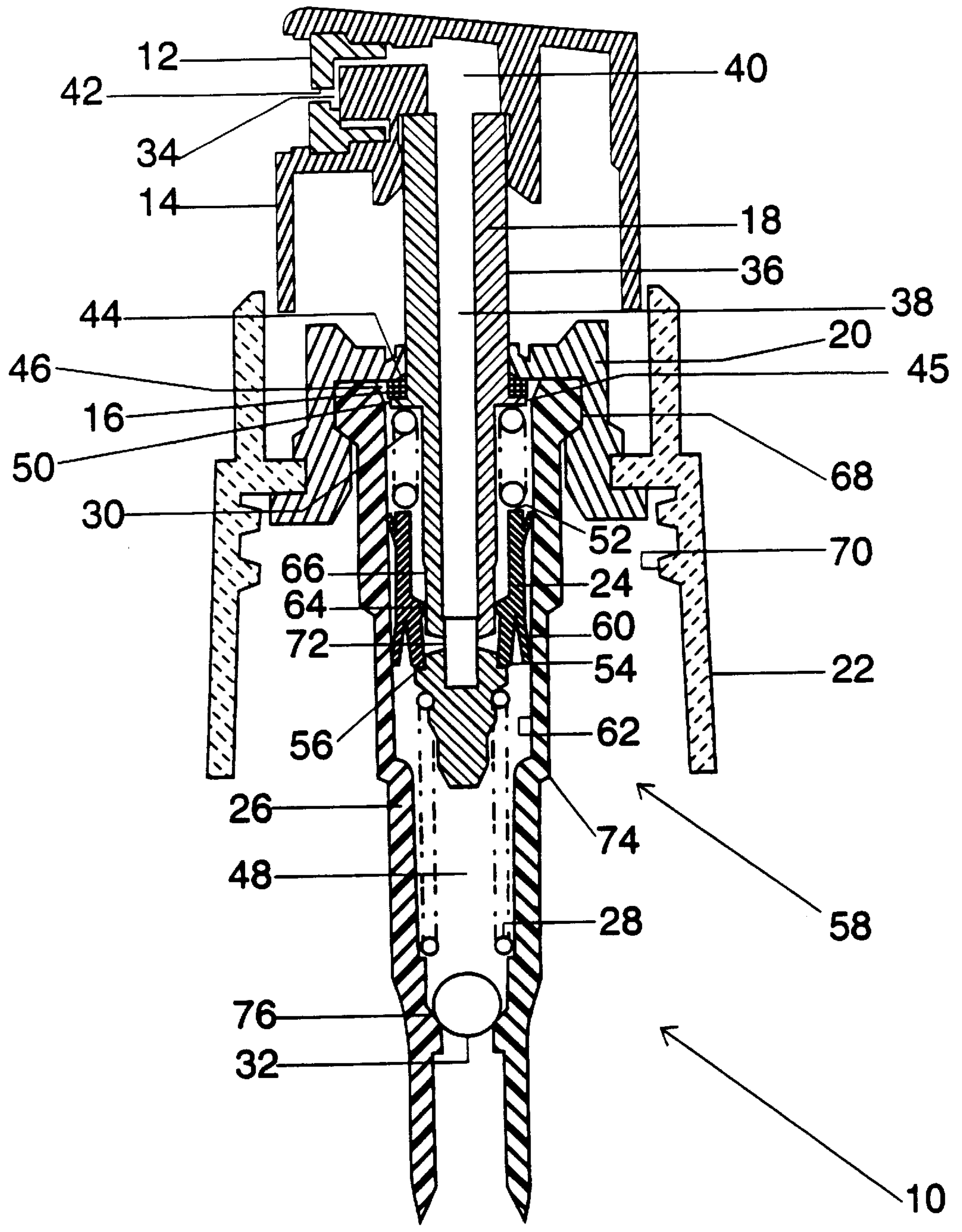
Figure 1 Prior Art
FIG. 1 is a cross-sectional view of a prior spray pump.

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

The present invention achieves a reduction in the emission of volatile organic compounds by dispensing a reduced dosage of a concentrated effective component at a pressure between about 120 and 160 psig (conventional spray pumps used for the application of hair spray provide a pump pressure of 90 psig). In fact, the present invention provides a concentrated reduced dosage spray pump delivery system for dispensing fluids containing volatile organic compounds with reduced emissions of the volatile organic compounds.

For the sake of explanation, it should be assumed that a conventional spray pump delivery system includes a quantity x of fluid containing a quantity y of volatile organic compounds and a quantity z of an effective component. It should also be assumed that the conventional spray pump delivery system is dispensed at a dosage of w grams/pump stroke of the spray pump with a resin flux v. The present spray pump delivery system includes a housing storing a fluid containing volatile organic compounds and an effective component, wherein, when compared to a conventional spray pump delivery system, the ratio of fluid to volatile organic compounds is approximately x to y and the ratio of fluid to the effective component is at most approximately x to z (in accordance with the preferred embodiment of the present invention, the ratio of fluid to the effective component is less than x to z). That is, the percentage by weight of the volatile organic compounds within the fluid remains the same as the conventional spray pump system, while the percentage by weight of the effective component within the fluid is preferably increased. The system also includes a spray pump in fluid communication with the fluid such that the spray pump atomizes and dispenses the fluid at a dosage less than w grams/pump stroke of the spray pump with a resin flux of approximately v, when compared to a conventional spray pump delivery system. The combination of concentrating the effective component in the fluid, maintaining the ratio of the fluid to the volatile organic compounds approximately constant, reducing the dosage per pump stroke of the spray pump, and maintaining the resin flux approximately constant, reduces the emission of volatile organic compounds.

With application in the dispensing of hair sprays containing volatile organic compounds, the combination of the spray pump and the concentrated hair spray formulation provides a desirable hair spray system that reduces the emission of volatile organic compounds and complies with the government guidelines for the emission of the volatile organic compounds. While the present invention will be described below for use in dispensing hair spray, it should be understood that the present invention may be employed to dispense a variety of fluids containing volatile organic compounds without departing from the spirit of the present invention.

Briefly, the present system reduces the dosage per pump stroke, but maintains the resin flux (that is, the quantity of polymer applied per square area of surface area) found in conventional spray pumps utilized in the spraying of hair sprays. Despite the reduction in the dosage per pump stroke, the resin flux is maintained by concentrating the polymer found in the hair spray and reducing the spray pattern. The reduction in the dosage results in a reduction in the emission of volatile organic compounds, since the percentage by weight of volatile organic compounds in the hair spray is substantially the same as with conventional hair spray formulations. As a result, the consumer achieves hold and styling similar to the hold and styling provided by prior spray pump dispensing systems, while reducing the emission of volatile organic compounds. In addition, the concentrated hair spray formulation includes substantially the same percentage by weight of water as conventional hair sprays. Therefore, the reduced dosage reduces the quantity of water applied to an individual's hair, enhancing the styling and hold characteristics of the hair spray.

The spray pump utilized in accordance with the present invention provides a pump pressure of between about 120 and 160 psig. The term "pump pressure" is used throughout the present application to define the energy level provided by the spray pump to atomize the hair spray as it moves within the spray pump and to dispense the atomized hair spray with sufficient momentum to propel it toward a desired surface. The high pump pressure is sufficient to atomize the concentrated hair spray into particle sizes suited for hair and to dispense the concentrated hair spray with sufficient force to propel it toward an individual's hair without substantial loss of the atomized hair spray. However, other pump pressures may be employed for various applications without departing from the spirit of the present invention. The increased pump pressure also permits the spray characteristics, for example, particle size, spray diameter, etc., to be varied to meet specific applications.

Figure 2:
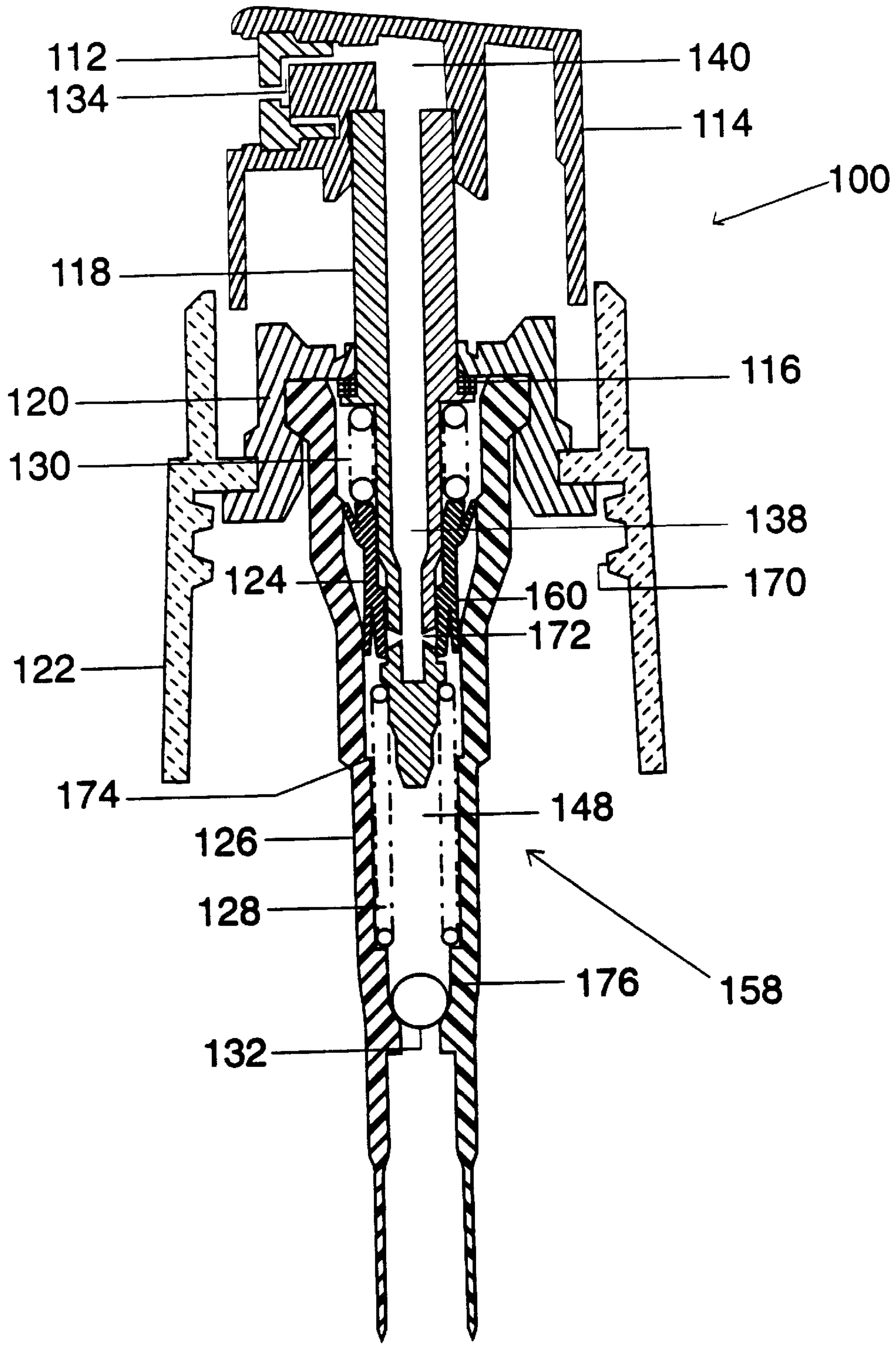
FIG. 2 is a cross-sectional view of a spray pump in accordance with the present invention.
Figure 3:
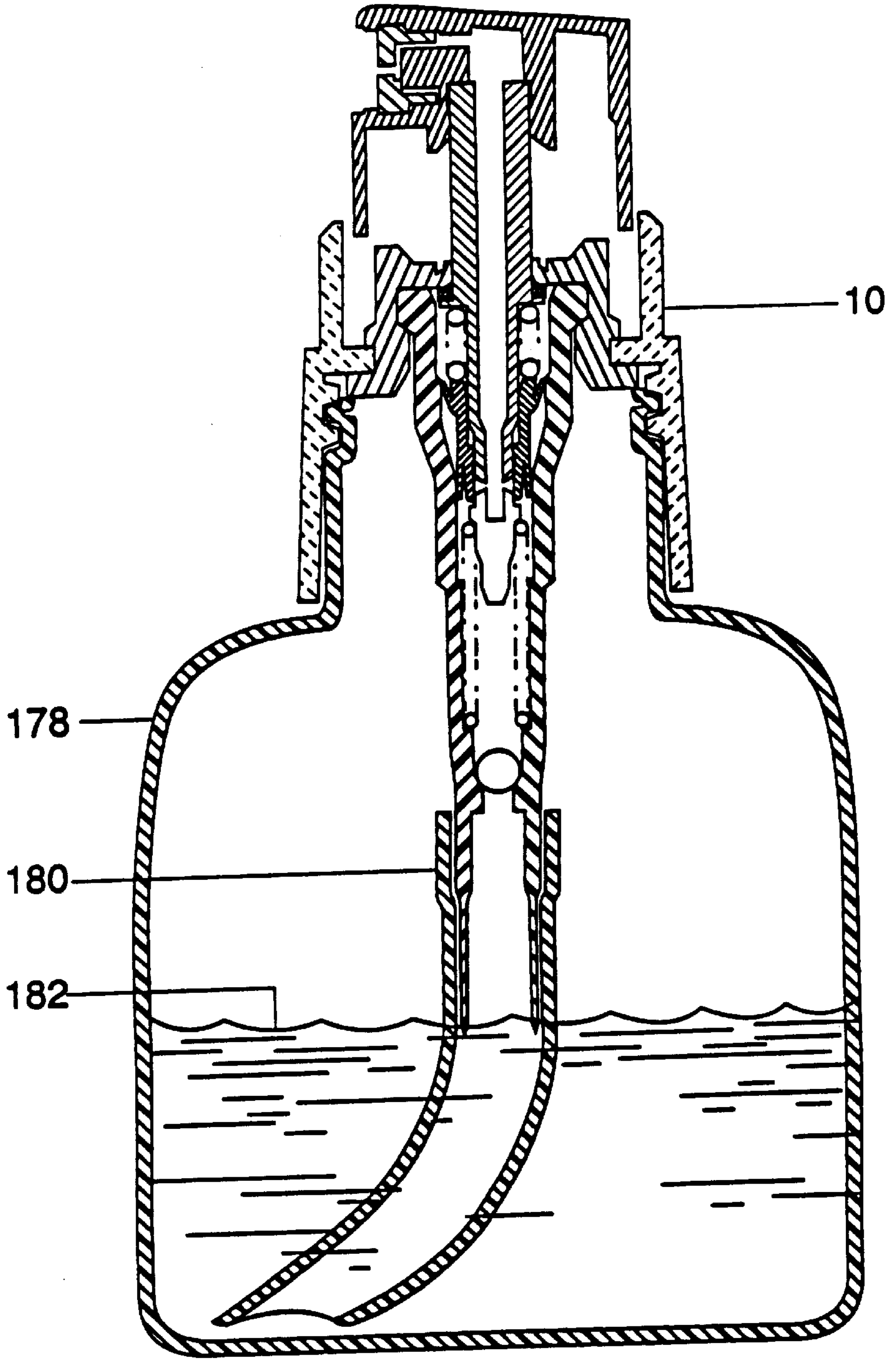
FIG. 3 is a cross-sectional view of the present spray pump delivery system.

With reference to FIGS. 2 and 3, the spray pump of the present invention is disclosed. As with the spray pump discussed above, the present spray pump 100 includes an insert 112, an actuator 114, a gasket 116, a stem 118, a turret 120, a closure 122, a piston 124, a body 126, a spring 128, a pre-compression spring 130 and a valve ball 132. These elements function by drawing fluid from a container 178 through a dip tube 180, atomizing the fluid such that it is dispensed as a spray of many small particles, and dispensing the atomized fluid with force sufficient to propel the spray at a desired object.

Closure 122 is mounted on the outer wall of the turret 120. The closure 122 includes internal threading 170 which permits attachment to a container 178.

As force is applied to the actuator 114, product in the body cavity 148 becomes pressurized. As pressure builds, the force acting on the piston 124 increases and eventually overcomes the pre-compression force of the pre-compression spring 130, causing the piston 124 to slide up the stem 118. Movement of the piston 124 up the stem 118 exposes the stem hole 172. When the stem hole 172 is exposed, fluid 182 flows into stem cavity 138, to the actuator chamber 140, into the swirl chamber 134 and eventually out of the spray pump 100.

At the bottom of the stroke, the outer piston seal 160 contacts cavity lip 174 of the body 126, thus stopping the movement of piston 124 relative to stem 118. When the pump 100 is initially filled with air, this serves as a priming mechanism, such that it opens stem hole 172 to allow compressed air to escape from body cavity 148. On the return stroke, the return spring 128 pushes the stem assembly 158 upward until the gasket 116 contacts the turret 120. A vacuum is formed inside the body cavity 148 during this motion, drawing fluid 182 up the dip tube 180 and into the pump 100. The valve ball 132 acts as a check valve and seals against the inlet surface 176 to prevent the undesired flow of fluid 182 between the body 126 and the dip tube 180.

Despite the similarity between the prior spray pump and the present spray pump, the diameter of the body cavity 148 and the diameter of the piston 124 are reduced to provide the reduced dosage per pump stroke and the increased pump pressure required by the present invention. Specifically, the increased pressure in the spray pump is derived in accordance with the following equation:

$$\text{Force } (F)=\text{Pressure } (P)*\text{Area } (A)$$

where,

F=the force necessary to actuate the spray pump,

P=pump pressure created to atomize and dispense material from within the spray pump;

A=the piston area of the spray pump.

As stated above, by reducing the piston area, while maintaining the force necessary to actuate the spray pump constant, the pump pressure is increased. The reduction in the diameter of the piston 124 and the body cavity 148 reduces the effective area of the piston and, accordingly, a higher pump pressure is achieved without increasing the force necessary to actuate the spray pump. This force is commonly set at between about 4 and 10 lbs.

The dose per pump stroke is also reduced as a result of the reduction in the diameter of the piston 124 and the body cavity 148. Specifically, as the effective area of the piston is reduced, the swept volume of the piston as it moves through a similar stroke length is reduced. That is, the dosage equals the effective piston area times the stroke length of the pump, or, stated in equation form:

$$\text{Dosage } (D)=\text{Area } (A)*\text{Length } (L)$$

where,

D=fluid dispensed with each pump stroke,

A=the piston area of the spray pump, and

L=stroke length of the actuator when pumping the spray pump.

Specifically, the present spray pump reduces the piston area proportional to the dosage and inversely proportional to the desired pressure, while keeping the stroke length constant. For example, a typical result is a doubling of pressure, a halving of dosage, and no change in the force to actuate. The development provides a pump that has the same, or lower, actuation force as commercially available pumps, while simultaneously generating higher pump pressure with a reduced dosage. While the present invention has been set forth utilizing a spray pump as disclosed above, it should be understood that variations in the structure of the spray pump could be employed without departing from the spirit of the present invention.

Hair spray used in spray pumps is generally composed of water, ethanol (the volatile organic compound), one or more polymers, and a plasticizer. In accordance with the present invention, the concentrated hair spray is fabricated such that the resin flux of the material remains constant despite the fact that the polymer content within the fluid is concentrated. With this in mind, the resin flux is defined by the following equation:

$$\Phi=(D*r)/((\pi/4)*d^2)$$

where,

Φ=resin flux,

D=dosage, r=percentage resin content, and d=spray pattern diameter.

By maintaining the resin flux, the polymer need not be increased substantially to produce the desired emissions reductions. Rather, one can maintain the resin flux by slightly increasing the polymer content level, maintaining the viscosity at reasonable levels, and significantly reducing the spray pattern diameter. By providing a hair spray in this manner, and delivering the hair spray at an elevated pump pressure and reduced dosage, a concentrated reduced dosage spray pump delivery system is provided. The delivery system exhibits reduced emissions of volatile organic compounds, while retaining the sprayable characteristics of prior spray pump systems.

The reduction in emissions is a result of the reduced dosage per pump stroke and the concentrated hair spray formulation. The concentrated hair spray formulation permits a user to apply hair spray with the same number of pump strokes, despite the reduced dosage. The increased pump pressure facilitates the application of the concentrated hair spray in a desirable manner.

By way of example, the following comparison is provided to show the difference between prior or conventional spray pump systems and the present or reduced dosage spray pump system:

| | Full Dose Conventional Product | Present Reduced Dose System |
|---|---|---|
| Bottle size: | 10.2 oz. (300 ml.) | 5.1 oz. (150 ml.) |
| Polymer level: | 4% by weight | 5% by weight |
| Spray Pattern: | 4 inches | 3.1 inches |
| Resin Flux: | 0.51 mg/in$^2$ | 0.51 mg/in$^2$ |
| Dosage: | 0.16 g/st | 0.08 g/st |
| Piston Diameter: | 0.309 inches | 0.202 inches |
| Piston Area: | 0.075 inches$^2$ | 0.032 inches$^2$ |
| Particle size | 57 | 50 |

While the parameters presented above are intended for one embodiment of the present invention, it is contemplated that the following ranges are within the spirit of the present invention: a polymer level between about 4% and 7% by weight, a spray pattern diameter between about 2.9 inches and 3.5 inches, and a dosage between about 0.07 grams/pump stroke and 0.09 grams/pump stroke. It should, however, be understood that these ranges are desirable for the disclosed embodiment of the present invention, and other ranges could be employed without departing from the spirit of the present invention.

By instructing users that they should simply apply the present hair spray system in the same manner they applied prior hair spray systems, it becomes readily apparent how the reduced emissions are achieved. Specifically, both systems include comparable percentages by weight of volatile organic compounds. However, each dose of the present system results in one half the hair spray, and ultimately one half the volatile organic compounds. As a result, an individual using, for example, 25 pumps of either the prior hair spray system or the present hair spray system, will emit one half the volatile organic compounds when the present hair spray system is employed.

While the present invention is disclosed for use with hair spray formulations, the present invention could be used with other fluids containing volatile organic compounds, without departing from the spirit of the present invention. This formulation approach will work regardless of polymer technology. The present system may use standard, commercially available polymers like Amphomer® for example which is supplied by National Starch Company, or it could employ polymers, for example as described in co-pending patent application Ser. Nos. 08/549,161; 07/883,979; 07/747,163; and 07/883,973. In general, the hair spray formula may be at the same polymer level as full dose or it may contain a higher polymer level (although the higher polymer level is preferred). It is not necessary to double the polymer level to achieve hold at 50% dosages. The key aspect of the formula is to keep polymer levels at the absolute minimum to provide good hold. Excessive polymer levels result in clogging, stability issue, poor spreading on hair and poor spray quality. This can result in consumer performance problems.

It should also be understood that the present hair spray system could be modified such that the dosage is reduced, while the pump pressure remains approximately 90 psig (as found in prior hair spray systems). The dosage would simply be reduced by limiting the stroke length of the spray pump sufficiently to limit the dosage to a desired amount. In such instances, a concentrated hair spray or a conventional hair spray may be used. Since the dosage has been decreased, the emission of volatile organic compounds will be reduced.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A concentrated reduced dosage spray pump delivery system for dispensing fluids containing actives and volatile organic compounds with reduced emissions of the volatile organic compounds, comprising:

a housing storing a concentrated fluid containing volatile organic compounds and an effective component, wherein the effective component is concentrated within the fluid;

a spray pump in fluid communication with the concentrated fluid containing the volatile organic compounds such that the spray pump dispenses the concentrated fluid at a reduced dosage per pump stroke;

wherein the combination of the concentrated fluid containing volatile organic compounds and the reduced dosage per pump stroke reduces the emission of volatile organic compounds, while the quantity of active applied per square area of application surface substantially remains the same;

wherein the resin flux of the fluid remains substantially constant despite the reduced dosage per pump stroke and the resin flux is defined by the following equation:

$$\Phi=(D*r)/((\pi/4)*d^2)$$

where,

Φ=resin flux,

D=dosage per pump stroke and is between approximately 0.07 grams/pump stroke and 0.09 grams/pump stroke, r=percentage effective component content in the fluid and is between approximately 1% and 10% by weight of the fluid, and preferably between 4% and 7%, and d=spray pattern diameter and is between approximately 2.9 inches and 3.5 inches;

wherein the dosage per pump stroke is defined by the equation:

$$\text{Dosage } (D)=\text{Area } (A)*\text{Length } (L)$$

where,

D=fluid dispensed with each pump stroke,

A=the piston area of the spray pump, and

L=stroke length of the actuator when pumping the spray pump, and the dosage per pump stroke is between approximately 0.07 grams/pump stroke and 0.09 grams/pump stroke.

2. A method for reducing the emission of volatile organic compounds when a fluid containing the volatile organic compounds is dispensed by a spray pump, comprising the follow steps:

concentrating an effective component of the fluid, while maintaining the percentage of volatile organic compounds within the fluid;

reducing the dosage of fluid dispensed with each pump stroke of the spray pump; and applying the fluid to a surface;

maintaining the resin flux of the applied fluid substantially constant despite the reduced dosage per pump stroke, wherein, the resin flux is defined by the following equation:

$$\Phi=(D*r)/((\pi/4)*d^2)$$

where,

Φ=resin flux,

D=dosage per pump stroke and is between approximately 0.07 grams/pump stroke and 0.09 grams/pump stroke, r=percentage effective component content in the fluid and is between approximately 1% and 10% by weight of the fluid, and preferably between 4% and 7%, and d=spray pattern diameter and is between approximately 2.9 inches and 3.5 inches;

wherein the dosage per pump stroke is defined by the equation:

$$\text{Dosage } (D)=\text{Area } (A)*\text{Length } (L)$$

where,

D=fluid dispensed with each pump stroke,

A=the piston area of the spray pump, and

L=stroke length of the actuator when pumping the spray pump, and the dosage per pump stroke is between approximately 0.07 grams/pump stroke and 0.09 grams/pump stroke.

* * * * *